US010659944B2

(12) United States Patent
Subramaniam et al.

(10) Patent No.: US 10,659,944 B2
(45) Date of Patent: May 19, 2020

(54) WIRELESS DEVICE BASED AUTO CHECK-IN AND INFORMATION SOURCING SYSTEM FOR ACCOUNTABILITY MANAGEMENT

(71) Applicant: SCOTT TECHNOLOGIES, INC., Monroe, NC (US)

(72) Inventors: Prabudas Subramaniam, Namakkal (IN); Mukul Jain, Bangalore (IN)

(73) Assignee: Scott Technologies, Inc., Monroe, NC (US)

( * ) Notice: Subject to any disclaimer, the term of this patent is extended or adjusted under 35 U.S.C. 154(b) by 0 days.

(21) Appl. No.: 16/096,760

(22) PCT Filed: Apr. 27, 2017

(86) PCT No.: PCT/US2017/029776
§ 371 (c)(1),
(2) Date: Oct. 26, 2018

(87) PCT Pub. No.: WO2017/189809
PCT Pub. Date: Nov. 2, 2017

(65) Prior Publication Data
US 2019/0124495 A1 Apr. 25, 2019

Related U.S. Application Data

(60) Provisional application No. 62/328,321, filed on Apr. 27, 2016.

(51) Int. Cl.
*H04W 4/90* (2018.01)
*G06Q 50/26* (2012.01)
(Continued)

(52) U.S. Cl.
CPC .............. *H04W 4/90* (2018.02); *G06Q 50/26* (2013.01); *H04W 4/021* (2013.01); *H04W 4/029* (2018.02); *G06Q 10/06* (2013.01)

(58) Field of Classification Search
CPC ..... H04L 67/22; H04M 3/5116; H04M 11/04; H04M 2242/04; H04M 3/42059;
(Continued)

(56) References Cited

U.S. PATENT DOCUMENTS

2014/0171013 A1 6/2014 Varoglu
2015/0278732 A1 10/2015 Fiedler
(Continued)

OTHER PUBLICATIONS

International Search report on PCT International Application No. PCT/US2017/029776, dated Jun. 29, 2017, 3 pages.

*Primary Examiner* — Kwasi Karikari

(57) ABSTRACT

A method for a wireless device (12) to facilitate personnel accountability is provided. Incident data is received. The incident data includes a location of an incident. A determination is made whether confirmation has been received that a user of the wireless device (12) agrees to respond to the incident. In response to determining confirmation has been received: a location of the wireless device (12) is determined, a first estimated time of arrival to the location of the incident from the location of the wireless device (12) is determined, transmission of the first estimated time of arrival is caused, a virtual region around the location of the incident is generated, a determination is made if the wireless device (12) enters the virtual region, transmission of a first update is caused in response to determining the wireless device (12) enters the virtual region.

15 Claims, 10 Drawing Sheets

(51) Int. Cl.
*H04W 4/021* (2018.01)
*H04W 4/029* (2018.01)
*G06Q 10/06* (2012.01)

(58) Field of Classification Search
CPC .......... H04M 3/42348; H04M 3/42357; G02B 2027/0138; G08B 25/006; G08B 25/00; G08B 27/001; G08B 21/00; G08B 21/02; G08B 21/0261; G08B 21/0272; G08B 21/043; G08B 13/19658; G08B 13/19684
See application file for complete search history.

(56) References Cited

U.S. PATENT DOCUMENTS

2015/0288819 A1* 10/2015 Brown ................. H04M 3/5116
379/45
2015/0289122 A1* 10/2015 Friesen .................. H04W 4/02
455/404.2

* cited by examiner

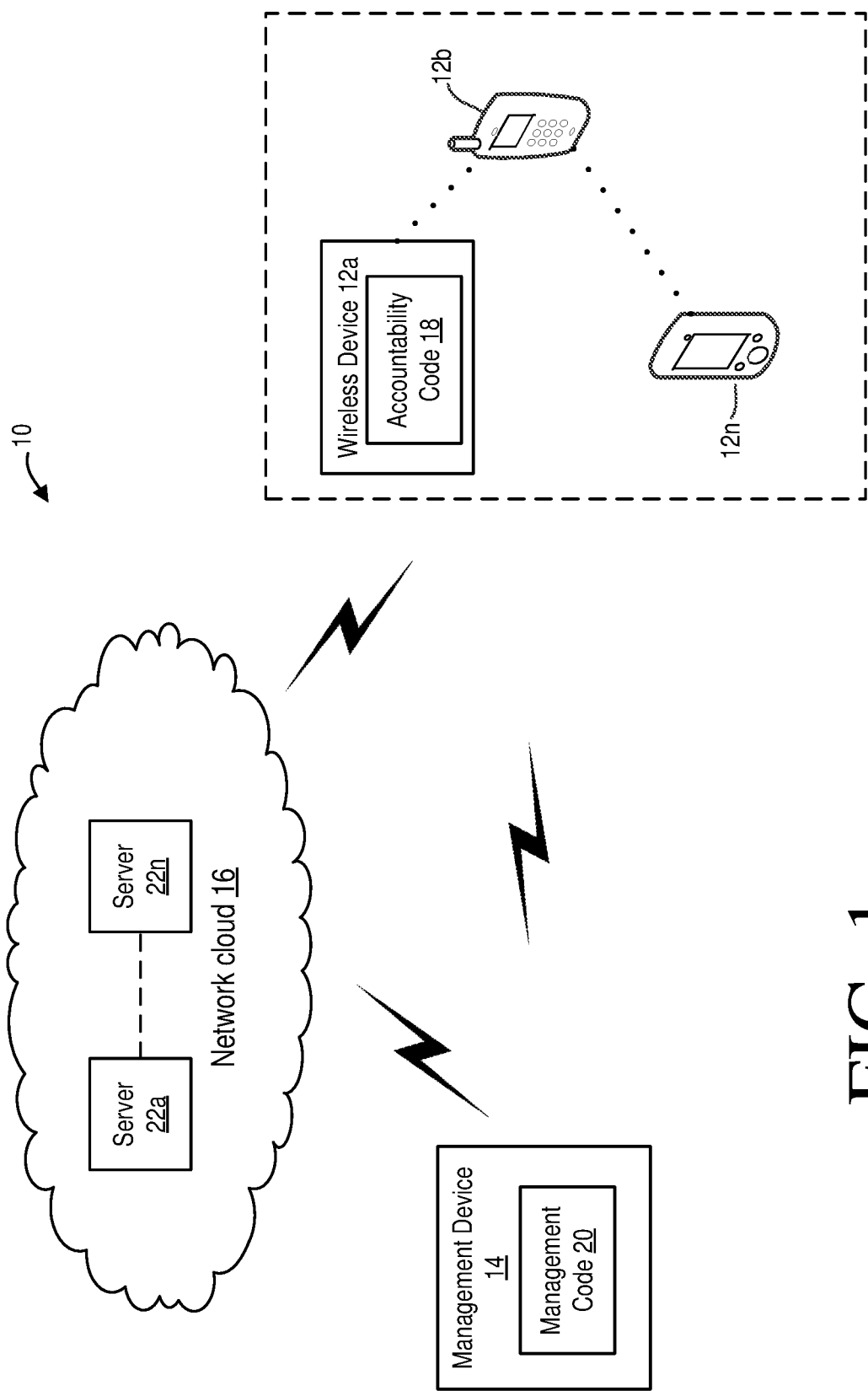

WIRELESS DEVICE BASED AUTO CHECK-IN AND INFORMATION SOURCING SYSTEM FOR ACCOUNTABILITY MANAGEMENT

CROSS REFERENCE TO RELATED APPLICATIONS

This application is a national stage filing under 35 U.S.C. 371 of PCT/US2017/029776, filed Apr. 27, 2017, which claims the patent benefit of U.S. Provisional Application No. 62/328,321, filed Apr. 27, 2016, the disclosures of which are incorporated by reference in their entirety herein.

TECHNICAL FIELD

The present invention relates to management of personal, and in particular to a method and system for accountability management of personnel.

BACKGROUND

First responder services are vital to providing emergency services at the scene of an emergency such as an accident, fire, natural disaster, etc. These first responders typically include firefighters, police officers, federal responders, paramedics, community first responders and other types of personnel. Accountability for first responders/personnel is a key concern for the first services industry.

Typically, an incident commander for a fire incident is responsible for accountability of fire related personnel involved in the incident. The incident commander depends on manual systems such as individual phone calls to initiate and manage the firefighters during an incident. This manual system wastes time as the incident commander has to manually call and/or receive calls from each responder via individual cell phones and then manually track which responder is at the incident location. Further, the incident commander is unable to know the status of the fire fighters, e.g., volunteer fire fighters, in real time. For example, absent manual communication, the incident commander is unable to know the number of firefighters responding to the incident. Nor does the incident commander have information regarding when the responding fire fighters may arrive at the incident scene. Also, using the existing manual system, the incident commander is unlikely to know about personnel from various departments like medical, police, federal agents and utility in real time.

One existing solution allows for the use of a proprietary wireless device or special equipment that relays the current location of the wireless device and a status to the incident commander. However, this solution has deficiencies when it comes to communications among the responders and aspects of notification to the incident commander.

SUMMARY

The present invention advantageously provides a method, system and device for accountability management of personnel.

According to one embodiment of the invention, a wireless device for facilitating personnel accountability is provided. The wireless device includes processing circuitry. The processing circuitry includes a processor and a memory. The memory contains instructions that, when executed by the processor, configure the processor to receive incident data, the incident data including a location of an incident and determine whether confirmation has been received that a user of the wireless device agrees to respond to the incident. The memory contains further instructions that, when executed by the processor, configure the processor to, in response to determining confirmation has been received: determine a location of the wireless device, determine a virtual region around the location of the incident, determine whether the wireless device enters the virtual region, and causes transmission of a first update in response to determining the wireless device enters the virtual region, the first update indicating the wireless device is located within the virtual region.

According to one embodiment of this aspect, the incident data includes at least one parameter for determining the virtual region. The at least one parameter includes at least one of size and radius of the virtual region. According to another embodiment of this aspect, the incident data includes at least one of a severity of the incident and type of incident. According to another embodiment of this aspect, the memory contains further instructions that, when executed by the processor, configure the processor to: determine if the wireless device exits the virtual region, and cause transmission of a second update if the wireless device exits the virtual region, the second update indicating the wireless device is outside of the virtual region.

According to another embodiment of this aspect, the wireless device includes a display. The memory contains further instructions that, when executed by the processor, configure the processor to: receive personnel data, the personnel data indicating at least one other wireless device that is within the virtual region, and cause the personnel data to be displayed by the display. According to another embodiment of this aspect, wireless device includes a display. The memory contains further instructions that, when executed by the processor, configure the processor to: receive personnel data, the personnel data indicating confirmation that at least one other user of at least one other wireless device agrees to respond to the incident, and cause the personnel data to be displayed by the display. According to another embodiment of this aspect, the wireless device includes a display for displaying information. The memory contains further instructions that, when executed by the processor, configure the processor to calculate an estimated time of arrival to the location of the incident from the location of the wireless device and cause transmission of the estimated time of arrival. According to another embodiment of this aspect, the wireless device includes at least one capture element configured to capture at least one of audio, video and at least one image. The memory contains further instructions that, when executed by the processor, configure the processor to: receive a capture command, trigger the at least one capture element to capture at least one of audio, video and at least one image in response to the received capture command, and cause transmission of the captured at least one of audio, video and at least one image. According to another embodiment of this aspect, the wireless device includes at least one sensor configured to capture sensor data. The memory contains further instructions that, when executed by the processor, configure the processor to receive a sensor capture command, trigger capture of sensor data in response to the received sensor capture command and cause transmission of the sensor data.

According to another embodiment of the invention, a method for a wireless device to facilitate personnel accountability is provided. Incident data is received. The incident data includes a location of an incident. A determination is made whether confirmation has been received that a user of the wireless device agrees to respond to the incident. In response to determining confirmation has been received: a location of the wireless device is determined, determining a virtual region around the location of the incident is generated, a determination is made whether the wireless device enters the virtual region, transmission of a first update is caused in response to determining the wireless device enters the virtual region, the first update indicating the wireless device is located within the virtual region.

According to one embodiment of this aspect, the incident data includes at least one parameter for determining the virtual region. The at least one parameter includes at least one of size and radius of the virtual region. According to another embodiment of this aspect, the incident data includes at least one of a severity of the incident and type of incident. According to another embodiment of this aspect, a determination is made if the wireless device exits the virtual region. Transmission of a second update is caused if the wireless device exits the virtual region, the second update indicating the wireless device is outside of the virtual region. According to another embodiment of this aspect, personnel data is received. The personnel data indicates at least one other wireless device that is within the virtual region. The personnel data is caused to be displayed by the display.

According to another embodiment of this aspect, personnel data is received. The personnel data indicates confirmation that at least one other user of at least one other wireless device agrees to respond to the incident. The personnel data is caused to be displayed by the display. According to another embodiment of this aspect, an estimated time of arrival to the location of the incident from the location of the wireless device is determined and the estimated time of arrival is caused to be transmitted.

According to another embodiment of this aspect, a capture command is received. The at least one capture element is triggered to capture at least one of audio, video and at least one image in response to the received capture command. Transmission of the captured at least one of audio, video and at least one image is caused. According to another embodiment of this aspect, a sensor capture command is received. Capture of sensor data is triggered in response to the received sensor capture command. Transmission of the sensor data is caused.

According to another embodiment of the invention, a wireless device for facilitating personnel accountability is provided. The wireless device includes an accountability module configured to receive incident data, the incident data including a location of an incident and determine whether confirmation has been received that a user of the wireless device agrees to respond to the incident. The accountability module is further configured to, in response to determining confirmation has been received, determine a location of the wireless device, determine a first estimated time of arrival to the location of the incident from the location of the wireless device, cause transmission of the first estimated time of arrival, generate a virtual region around the location of the incident, determine if the wireless device enters the virtual region, and cause transmission of a first update if the wireless device enters the virtual region, the first update indicating the wireless device is located within the virtual region.

According to another embodiment of this aspect, the accountability module is further configured to determine if the wireless device exits the virtual region, and cause transmission of a second update if the wireless device exits the virtual region, the second update indicating the wireless device is outside of the virtual region.

According to another embodiment of the invention, a management device for facilitating personnel accountability is provided. The management device includes processing circuitry that includes a processor and a memory. The memory contains instructions that, when executed by the processor, configure the processor to: generate a virtual region, generate incident data, the incident data include at least one parameter of the virtual region, cause transmission of the incident data to a plurality of wireless device, receive location information from at least one of the plurality of wireless devices, determine at least one estimated time of arrival (ETA) for the at least one of the plurality of wireless devices, and cause transmission of the at least one ETA.

According to one embodiment of this aspect, the virtual region is generated based at least in part on a severity of the incident, population of an area proximate an incident area and type of incident. According to another embodiment of this aspect, the memory contains further instructions that, when executed by the processor, configure the processor to: receive location information from at least one wireless device, determine whether the at least one wireless device is within the virtual region based on the received location information, and cause transmission of a notification to at least one other wireless device if the determination is made that the at least one wireless device is within the virtual region.

According to another embodiment of the invention, a method for facilitating personnel accountability is provided. A virtual region is generated. Incident data is generated. The incident data include at least one parameter of the virtual region. Transmission of the incident data to a plurality of wireless device is caused. Location information from at least one of the plurality of wireless devices is received. At least one estimated time of arrival (ETA) for the at least one of the plurality of wireless devices is determined. Transmission of the at least one ETA is caused.

According to another embodiment of this aspect, the virtual region is generated based at least in part on a severity of the incident, population of an area proximate an incident area and type of incident.

According to another embodiment of this aspect, location information is received from at least one wireless device. A determination is made whether the at least one wireless device is within the virtual region based on the received location information. Transmission of a notification to at least one other wireless device is caused if the determination is made that the at least one wireless device is within the virtual region.

According to another embodiment of the invention, a management device for facilitating personnel accountability is provided. The management device includes an administration module configured to: generate a virtual region, generate incident data where the incident data include at least one parameter of the virtual region, cause transmission of the incident data to a plurality of wireless device, receive location information from at least one of the plurality of wireless devices, determine at least one estimated time of arrival (ETA) for the at least one of the plurality of wireless devices, and cause transmission of the at least one ETA.

BRIEF DESCRIPTION OF THE DRAWINGS

The instant invention advantageously provides a method, system and device for accountability management of personnel.

A more complete understanding of the present invention, and the attendant advantages and features thereof, will be more readily understood by reference to the following detailed description when considered in conjunction with the accompanying drawings wherein:

FIG. 1 is a block diagram of an exemplary accountability management system in accordance with the principles of the invention;

DETAILED DESCRIPTION

Figure 3:
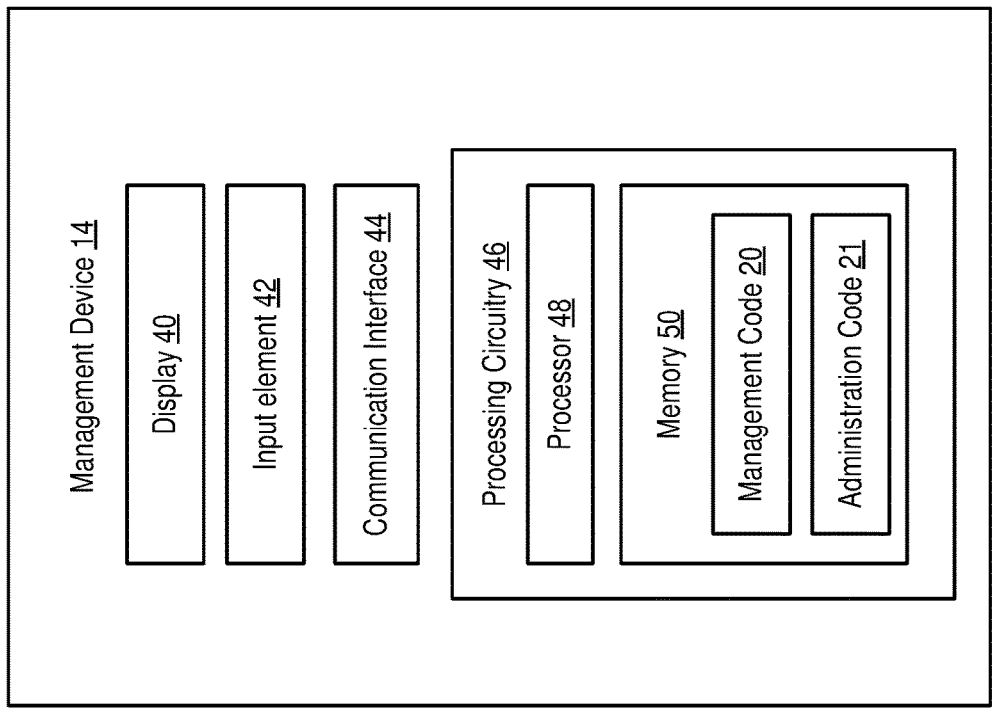
FIG. 3 is a block diagram of an exemplary management device in accordance with the principles of the invention.

The instant invention advantageously provides a method, system and device for accountability management of personnel. In one or more embodiments, the instant invention provides a system architecture that communicates incident information to and from one or more wireless devices associated with personnel in which the wireless devices are configured to perform various functions described herein for accounting for the personnel in route to the incident location, at the incident location and when leaving the incident location.

Before describing in detail exemplary embodiments that are in accordance with the disclosure, it is noted that the embodiments reside primarily in combinations of device components and processing steps related to accountability of personnel. Accordingly, components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments a non-limiting term "wireless device" is used. The wireless device herein can be any type of wireless device capable of communicating with network node or another wireless device over radio signals. The wireless device may also be radio communication device, target device, device to device (D2D) wireless device, machine type wireless device or wireless device capable of machine to machine communication (M2M), a sensor equipped with wireless device, iPAD, Tablet, mobile terminals, smart phone, laptop embedded equipped (LEE), laptop mounted equipment (LME), USB dongles, Customer Premises Equipment (CPE) etc.

Referring now to drawing figures in which like reference designators refer to like elements there is shown in FIG. 1 an exemplary system for performing accountability management of personnel in accordance with the principles of the invention and designated generally as "10." System 10 includes one or more wireless devices 12a-12n (collectively referred to as wireless device 12), one or more management devices 14 and one or more network clouds 16 in communication with each other via one or more communication links, paths and/or networks.

Wireless device 12 includes accountability code 18 for performing the accountability process described in detail with respect to FIGS. 2, 4, 5 and 6. Management device 14 that includes management code 20 for performing the management process described in detail with respect to FIGS. 3, 7, and 8. Network cloud 16 includes one or more servers 22a-22n (collectively referred to as server 22). In one or more embodiments, server 22 facilitates the management of information and data between wireless device 12 and management device 14 as described herein with respect to FIGS. 7 and 8. In one or more other embodiments, one or more functions performed by wireless device 12 and/or management device 14 are alternatively performed by network cloud 16, i.e., one or more servers 22, such as in a distributed manner.

Figure 2:
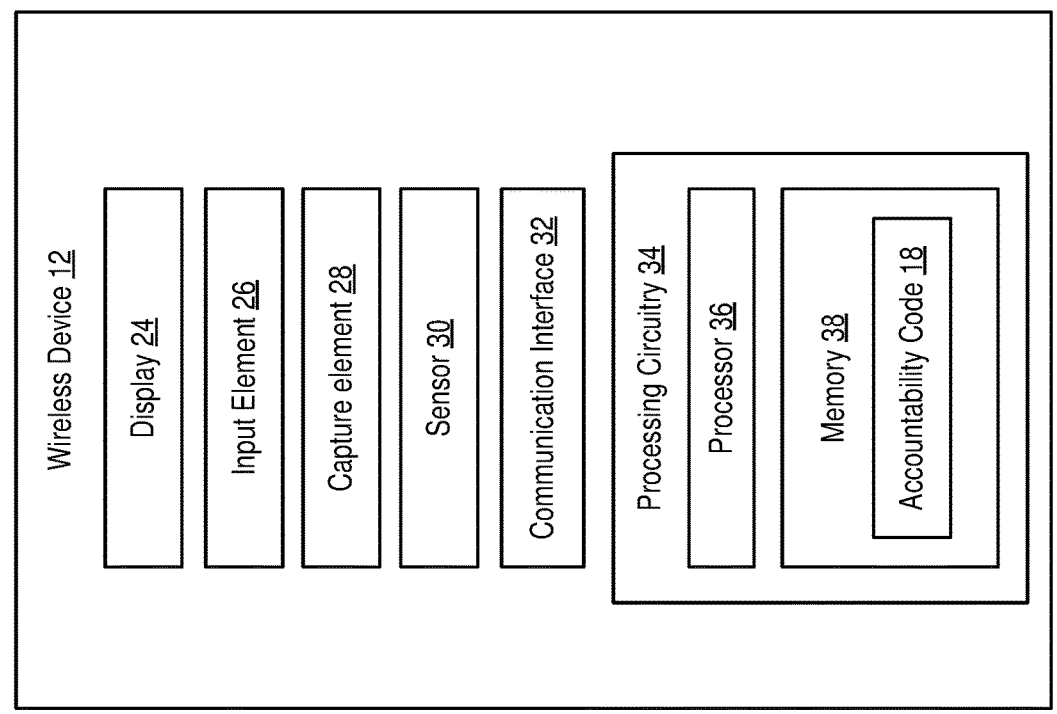
FIG. 2 is a block diagram of an exemplary wireless device in accordance with the principles of the invention.

FIG. 2 is a block diagram of wireless device 12 in accordance with the principle of the invention. Wireless device 14 may be a radio communication device, target device, device-to-device wireless device, user equipment (UE), machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art. Wireless device 12 includes display 24 that is configured to display information such as incident information and other data described herein. Display 24 may be an organic light-emitting diode (OLED), light-emitting diode (LED) or liquid crystal display (LCD), among other types of displays that are known in the art. Wireless device 12 includes input element 26 that is configured to receive one or more inputs from a user of wireless device 12. Input element 26 may include one or more buttons, keyboard, touch screen elements, microphone and other input device/mechanism/entity that allows wireless device 12 to receive input from a user. Wireless device 12 includes one or more capture elements 28 for capturing images, video and/or audio. In one or more embodiments, capture element 28 includes a camera and/or microphone.

Wireless device 12 includes one or more sensors 30. Sensor 30 is configured to capture sensor data such as one or more measurements. In one or more embodiments, sensor 30 includes temperature sensors, motion sensor, light sensor, accelerometers and/or other types of sensors that are known in the art. Wireless device 12 includes communication interface 32 that is configured to communicated to with one or more other wireless devices 12, management device 14 and network cloud 16 via one or more communication protocols and one or more communication links/paths. In one or more embodiments, one or more communication interfaces 32 are replaced one or more transmitters and/or one or more receivers communicating information.

Wireless device 12 includes processing circuitry 34 that is configured to perform wireless device functions as described herein. Processing circuitry 34 includes processor 36 and memory 38. Processing circuitry 34 may comprise integrated circuitry for processing and/or control, e.g., one or more processors and/or processor cores and/or FPGAs (Field Programmable Gate Array) and/or ASICs (Application Specific Integrated Circuitry). Processor 36 may be configured to access (e.g., write to and/or reading from) memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 38 may be configured to store code executable by processor 36 and/or other data, e.g., data pertaining to communication, e.g., configuration and/or address data of nodes, etc.

Processing circuitry 34 may be configured to control any of the methods and/or processes described herein and/or to cause such methods and/or processes to be performed, e.g., by wireless device 12. Corresponding instructions may be stored in the memory 38, which may be readable and/or readably connected to processor 36. One or more processors 36 are configured to execute instructions stored in memory 38. Memory 38 is configured to store data, programmatic software code and/or other information described herein. Memory 38 is configured to store accountability code 18. For example, accountability code 18 includes instructions that, when executed by processor 36, causes processor 36 to perform the process discussed in detail with respect to FIGS. 4 and 5a-5b.

FIG. 3 is a block diagram of an exemplary management device 14 in accordance with the principles of the invention. In one or more embodiments, management device 14 is a server such as a single physical unit, a blade in a server rack, or a distributed processing system such as a virtual server. In one or more other embodiments, management device 14 is a wireless device as described above that is configured to perform the manage device 14 functions described herein. Management device 14 includes display 40, input element 42, communication interface 44, processing circuitry 46, processor 48 and memory 50 that correspond to components as described with respect to wireless device 12, but with size and performance being based on design need. Memory 50 is configured to store management code 20. For example, management code 20 includes instructions that, when executed by processor 48, causes processor 48 to perform the process discussed in detail with respect to FIG. 6. Memory 50 is configured to store administration code 21. For example, administration code 21 includes instructions that, when executed by processor 48, causes processor 48 to perform the process discussed in detail with respect to FIG. 7. In one or more embodiments, management code 20 or administration code 21 may be omitted based on design choice or design implementation such as if whether wireless device 12 or management device 14 are perform certain calculations such as a virtual region and/or ETA calculation.

Figure 4:
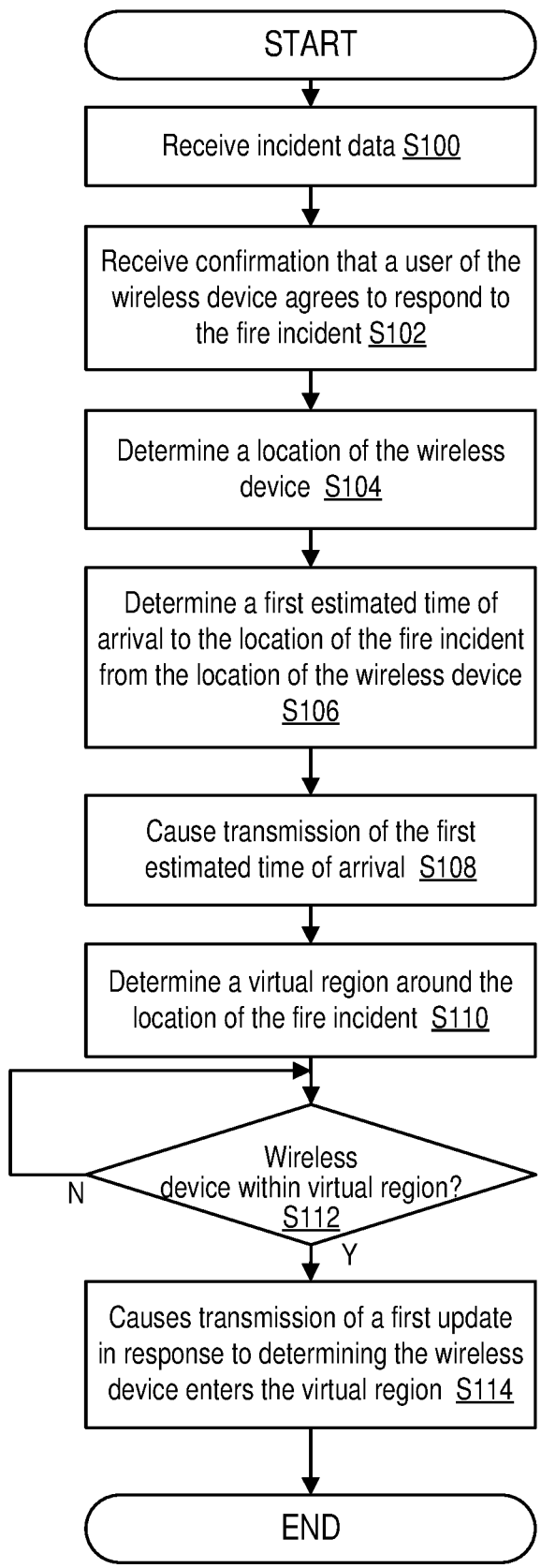
FIG. 4 is a flow diagram of an exemplary accountability process in accordance with the principles of the invention.

FIG. 4 is a flow diagram of an exemplary accountability process of accountability code 18 in accordance with the principles of the invention. Processing circuitry 34 receives incident data via communication interface 32 (Block S100). In one or more embodiments, incident data includes at least one parameter for determining the virtual region. In one or more embodiments, the at least one parameter includes at least one size and radius of the virtual region. In one or more embodiments, incident data includes a location of an incident such as a fire incident, at least one parameter for configuring a virtual region such as a geo-fence as discussed below, a severity of the incident, type of incident, among other information associated to the incident. Processing circuitry 34 receives confirmation that a user of wireless device 12 agrees to respond to the incident, e.g., fire incident, indicated in the incident data (Block S102). In one or more embodiments, the confirmation is included and/or indicated as part of personnel data. For example, in one or more embodiments, processing circuitry 34 receives personnel data indicating confirmation that at least one other user of at least one other wireless device agrees to respond to the incident. In another example, in one or more embodiments, processing circuitry 34 receives personnel data that indicates at least one other wireless device that is within the virtual region. In one or more embodiments, the confirmation is received from a user of wireless device 12, via input element 26, in response to prompting, via display 24, the user to confirm/commit or decline to respond to the incident. In one or more embodiments, processing circuitry 34 causes the personnel data to be displayed by display 24.

Processing circuitry 34 determines a location of wireless device 12 (Block S104). In one or more embodiments, processing circuitry 34 determines the location of the wireless device 12 in response to receiving the confirmation that the user agrees to respond to the incident. In one or more embodiments, the location of wireless device 12 is determined by Global Positioning System (GPS), triangulation and/or other location determining methods known in the art that may be performed by wireless device 12 and/or a network (not shown) to which wireless device 12 is connected. Processing circuitry 34 determines a first estimated time of arrival (ETA) to the location of the incident from the determined location of the wireless device 12 (Block S106). In one or more embodiments, processing circuitry 34 determines the first ETA based on GPS and/or traffic information. In one or more embodiments, the determination of the first ETA is performed periodically. In one or more other embodiments, wireless device 12 transmits its determined location to management device 14 and/or server 22, and, in response, receives a calculated ETA from management device 14 and/or server 22 such that the ETA calculation is performed by other than wireless device 12 as discussed in detail with respect to FIG. 7.

Processing circuitry 34 causes the transmission of the first ETA (Block S108). In one or more embodiments, processing circuitry 34 causes transmission of the first ETA to management device 14 via network cloud 16. In one or more embodiments, the updated or periodically determined first ETA is transmitted after every update or periodic determination such as to provide management device 14 with updated ETA information of wireless device 12. Processing circuitry 34 determines a virtual region around the location of the incident (Block S110). For example, processing circuitry 34 generates a logical virtual region, i.e., "geo-fence" around the incident location. In one or more embodiments, the incident date includes at least one parameter for configuring or generating the virtual region. The parameters may include at least one of a size of the virtual region, population of the area proximate the incident area, size of the virtual region, shape of the virtual region, radius of the virtual region from the center of the incident area, one or more latitudes of the incident area, one or more longitudes of incident area, GPS coordinates of the incident area, GPS coordinates of the center of the incident area and other information that may be used to determine the virtual region. In one or more embodiments, wireless device 12 determines the size and shape of the virtual region based the population of the area proximate the incident area, GPS coordinates of the center of the incident area and other information. In one or more other embodiments, the virtual region is pre-calculated by management device 14 and/or server 22, where the incident data informs wireless device 12 of the characteristics of the virtual region such as size, shape, radius, etc.

Processing circuitry 34 determines whether wireless device 12 is within the virtual region (Block S112). For example, processing circuitry 34 compares the determined location of wireless device 12 with the virtual region to determine if wireless device 12 is within the virtual region. In one or more embodiments, the determination of Block S112 is performed after the location of wireless device 12 has been determined. The determined virtual region and determined wireless device 12 location may be stored in memory 38. If processing circuitry 34 determines wireless device 12 is not within the virtual region, processing circuitry 34 performs the determination of Block S112.

If processing circuitry 34 determines wireless device 12 is within the virtual region, processing circuitry 34 causes transmission of a first update in response to determining that wireless device 12 is within the virtual region (Block S114). The first update indicates that wireless device 12 is within the virtual region, i.e., wireless device 12 has "checked-in" to the incident location. In one or more embodiments, the first update is transmitted, by communication interface 32, to management device 14 via network cloud 16 and/or other network. In one or more embodiments, processing circuitry 34 causes transmission of captured data and/or sensor data. For example, in one or more embodiments, the captured data may include image(s), video(s) and/or audio recordings. For example, in one or more embodiments, the sensor data includes data captured by one or more of a temperature sensor, motion sensor, light sensor and accelerometer.

In one or more embodiments, processing circuitry 34 is configured to receive a capture command such as from management device 14. Processing circuitry 34 is configured to trigger at least one capture element 28 to capture at least one of audio, video and at least one image in response to the received capture command, and configured to cause transmission of the captured at least one audio, video and at least one image such as to management device 14, server 22 and/or other element(s) of system 10.

In one or more embodiments, processing circuitry 34 is configured to receive a sensor capture command such as from management device 14, trigger capture of sensor data in response to the received sensor capture command, and cause transmission of the sensor data such as to management device 14, server 22 and/or other element(s) of system 10.

Therefore, the invention advantageously accounts for the location and movement of wireless device 12 toward and within the incident location/area once wireless device 12 receives confirmation that the user agrees to respond to the incident. Further, system 10 automatically provides updates to management device 14 of the location of wireless device 12 and once wireless device 12 is within the virtual region, i.e., incident area.

Figure 5A:
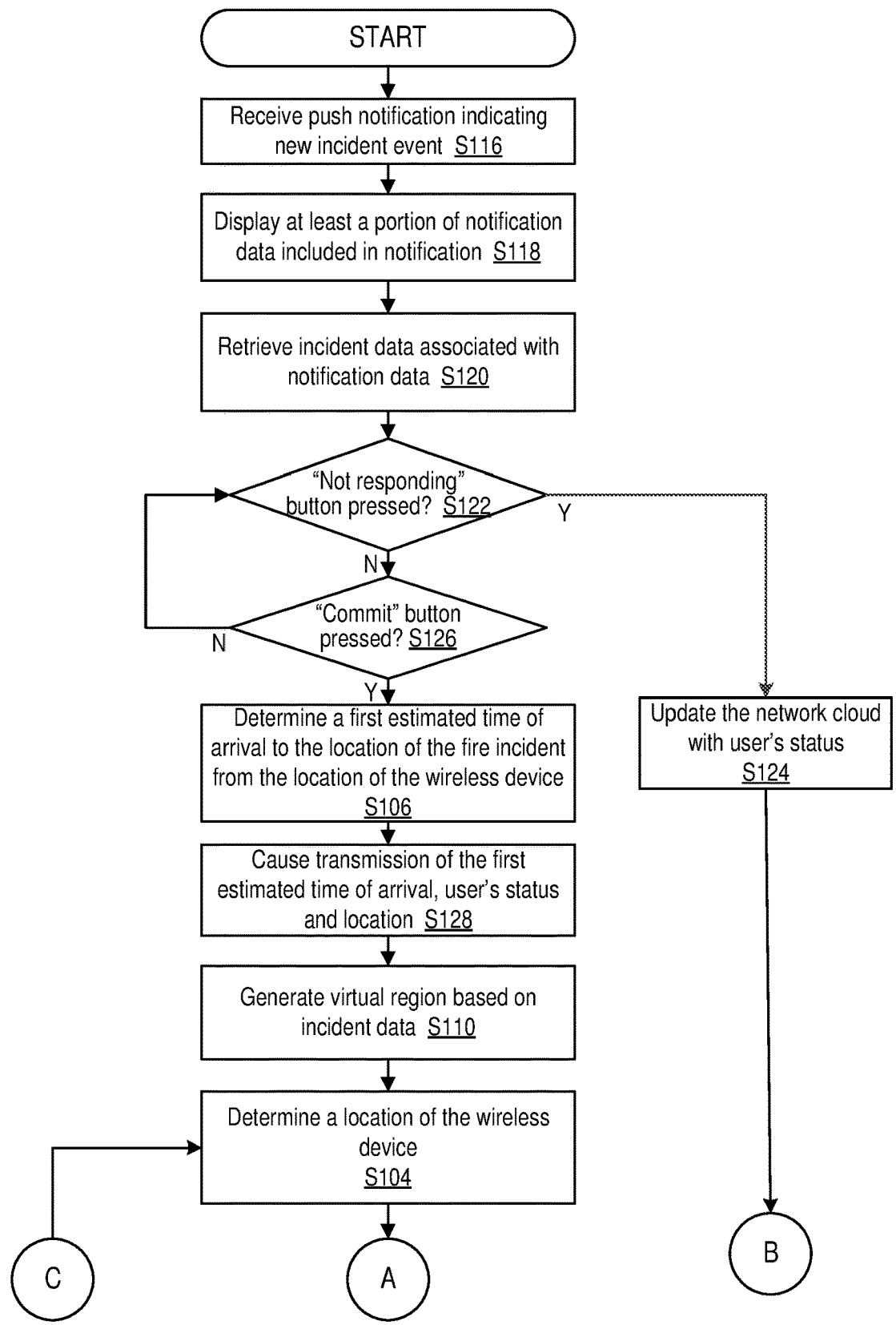
FIGS. 5A-5B are flow diagrams of another exemplary accountability process in accordance with the principles of the invention.
Figure 5B:
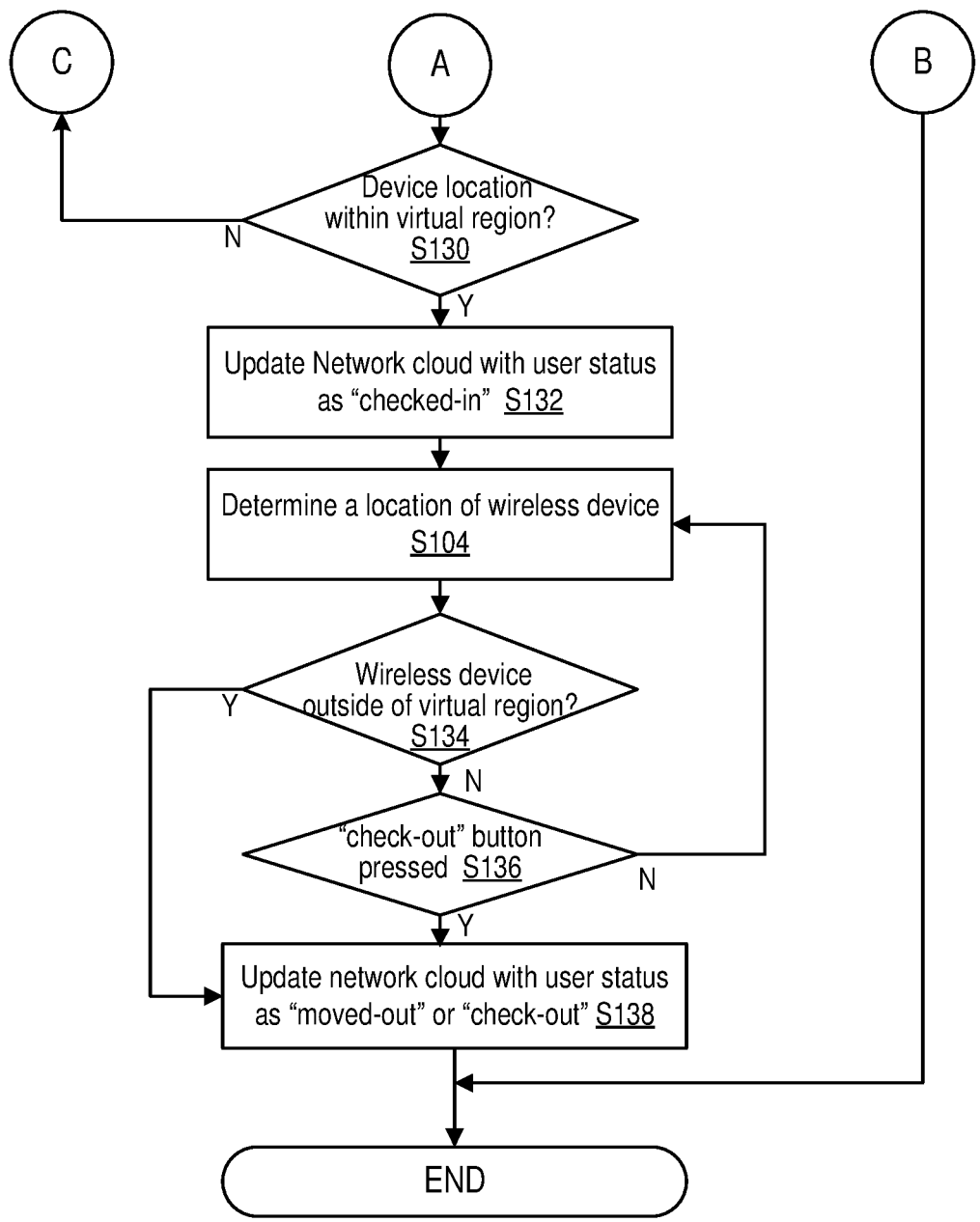

FIGS. 5A-5B are a flow diagram of another exemplary accountability process of accountability code 18 in accordance with the principles of the invention. Processing circuitry 34 receives a push notification indicating a new incident event (Block S116). For example, in one or more embodiments, the push notification includes notification data related to the incident such as location, type of incident and/or other information. The notification data is less inclusive than incident data as the notification data is used to provide the user of wireless device 12 with general information about the incident such as to provide enough information to allow the user to commit or not respond to the incident, as discussed below.

Processing circuitry 34 displays at least a portion of the notification data (Block S118). For example, processing circuitry 34 displays the location of the incident and the type of incident. Processing circuitry 34 retrieves incident data associated with the notification data (Block S120). Processing circuitry 34 determines whether a "not responding" selection has been made, e.g., such as through an on screen or physical button press or trigger (Block S122). For example, in one or more embodiments, input element 26 is a "not responding" button that, when triggered, indicates the user of wireless device 12 will not respond to the incident associated with the notification. Processing circuitry 34 updates network cloud 16 if the "not responding" button on wireless device 12 was pressed or triggered, thereby allowing network cloud 16 to track users that having indicated they will not be responding to the incident (Block S124). In one or more embodiments, processing circuitry 34 updates network cloud 16 via one or more messages or signaling as is known in the art.

If processing circuitry 34 determines a "not responding" selection has not been made, processing circuitry 34 determines whether a "commit" button selection has been made (Block S126). For example, in one or more embodiments, input element 26 is a "commit" button that, when selected, indicates the user of wireless device 12 will respond or agrees to respond to the incident associated with the notification. If processing circuitry 34 determines the "commit"

button selection has not been made, processing circuitry 34 performs the determination of Block S122. If processing circuitry 34 determines the "commit" button selection has been made, processing circuitry 34 determines a first estimated time (ETA) of arrival to the location of the incident from the location of wireless device 12, as discussed above (Block S106).

Processing circuitry 34 causes transmission of the first ETA, user's status and wireless device location (Block S128). For example, processing circuitry 34 causes transmission of the first ETA, user's status and device location to network cloud 16 and/or management device 14. The user's status may indicate whether the user is or is not responding to the incident, i.e., whether the "commit" selection or the "not responding" selection has been made. Wireless device 12 location may be determined as discussed above with respect to Block S104. Processing circuitry 34 generates a virtual region based on incident data, as discussed above (Block S110). Processing circuitry 34 determines a location of wireless device 12 (Block S104). Processing circuitry 34 determines whether wireless device 12 location determined in Block S104 is within the virtual region (Block S130). For example, processing circuitry 34 may compare coordinates defining the virtual region with coordinates of the wireless device 12 location to determine if wireless device 12 is within the virtual region.

If processing circuitry 34 determines a location of wireless device 12 is not within the virtual region, processing circuitry 34 performs the determination of Block S104. If processing circuitry 34 determines wireless device 12 location is within the virtual region, processing circuitry 34 updates network cloud 16 with user status as "checked-in" (Block S132). In other words, processing circuitry 34 automatically updates network cloud and/or management device 14 to indicate that a user associated with wireless device 12 has arrived at the incident, i.e., has "checked-in" to the incident location. Processing circuitry 34 determines a location of wireless device 12, as discussed above (Block S104).

Processing circuitry 34 determines whether wireless device 12 is outside of the virtual region, i.e., processing circuitry 34 determines if wireless device 12 exits the virtual region (Block S134). For example, processing circuitry 34 may compare coordinates defining the virtual region with coordinates of wireless device 12 location to determine if wireless device 12 is outside of the virtual region. If processing circuitry 34 determines wireless device 12 is not outside of the virtual region, processing circuitry 34 determines whether a "check-out" selection has been made (Block S136). For example, in one or more embodiments, input element 26 is a "check-out" button that, when selected, indicates the user of wireless device 12 is no longer responding to the incident associated with the notification. If processing circuitry 34 determines the "check-out" selection has not been made, processing circuitry 34 performs the determination of Block S104.

If processing circuitry 34 determines the "check-out" selection has been made, processing circuitry 34 updates network cloud 16 with user status as "moved-out" or "checked-out" (Block S138). For example, the user status of "moved-out" or "checked-out" indicates that the user is no longer responding to the incident associated with the notification. While several selection labels such as "moved-out", "checked-in", etc. have been used herein, these labels are merely for descriptive purposes and should not be construed as limiting the invention to a specifically labeled selection, i.e., other labels can be used so long as each selection provides a specific indication as described herein. Referring back to Block S134, if wireless device 12 is determined to be outside of the virtual region, processing circuitry 34 performs Block S138, as described herein. For example, in one or more embodiments, processing circuitry 34 causes transmission of an update if wireless device 12 exits the virtual region. In one or more embodiments, the second update indicates wireless device 12 is outside of the virtual region.

In one or more embodiments, processing circuitry 34 receives a capture command that triggers at least one capture element 28 to capture at least one of audio, video and at least one image. Processing circuitry 34, in one or more embodiments, causes transmission of the captured at least one audio, video and at least one image such as to manage device 14 and/or other element in system 10. In one or more embodiments, wireless device 12 includes at least one sensor 30. Processing circuitry 34, in one or more embodiments, receives a sensor capture command, triggers capture of sensor data in response to the received sensor capture command, and causes transmission of the sensor data.

Figure 6:
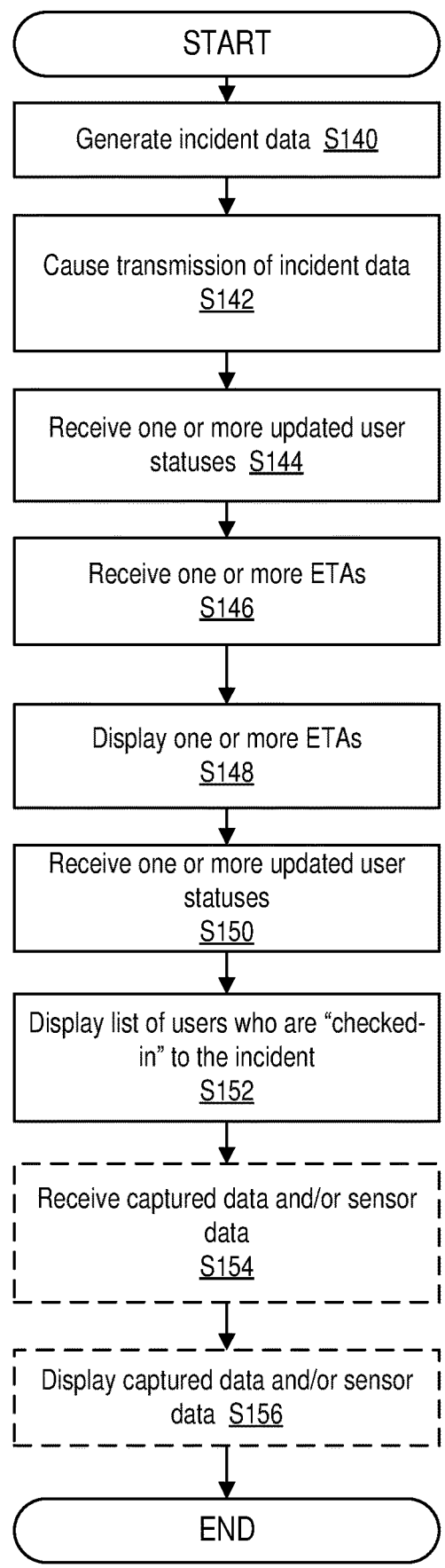
FIG. 6 is a flow diagram of an exemplary an exemplary management process in accordance with the principles of the invention.

FIG. 6 is a flow chart of an exemplary management process of management code 20 in accordance with the principles of the invention. Processing circuitry 46 generates incident data (Block S140). In one or more embodiments, processing circuitry 46 generates incident data based on inputs from a user such as from the incident commander via input element 42. Processing circuitry 46 causes transmission of the incident data to one or more wireless devices 12 via network cloud 16 and/or communication networks (Block S142). Processing circuitry 46 receives one or more updated user statues (Block S144). For example, after transmitting the incident data to one or more wireless devices 12, processing circuitry 46 receives one or more user statuses associated with the one or more wireless devices 12 indicates whether the respective users will respond to the incident.

Processing circuitry 46 receives one or more ETAs associated with respective to one or more wireless devices 12 (Block S146). For example, in one or more embodiments, respective one or more wireless devices 12 determine respective ETAs as described above in Block S106. Processing circuitry 46 displays the received one or more ETAs (Block S148). Processing circuitry 46 receives one or more updated user statuses (Block S150). For example, processing circuitry 46 may receive a user status indicating a user has "checked-in" to the virtual region, changed a "commit" status to a "not responding" status, etc. Processing circuitry 46 displays, via display 24, a list of users who are "checked-in" to the incident (Block 152). Processing circuitry 46 receives captured data and/or sensor data (Block S154). In one or more embodiments, processing circuitry 46 receives captured data and/or sensor data generated/captured by one or more wireless devices 12. For example, in one or more embodiments, the captured data may include image(s), video(s) and/or audio recordings. For example, in one or more embodiments, the sensor data includes data captured by one or more of a temperature sensor, motion sensor, light sensor and accelerometer. Processing circuitry 46 displays captured data and/or sensor data via display 40. In one or more embodiments, Blocks S154 and S156 may be omitted based on design choice or in case no captured data and/or sensor data is received.

Figure 7:
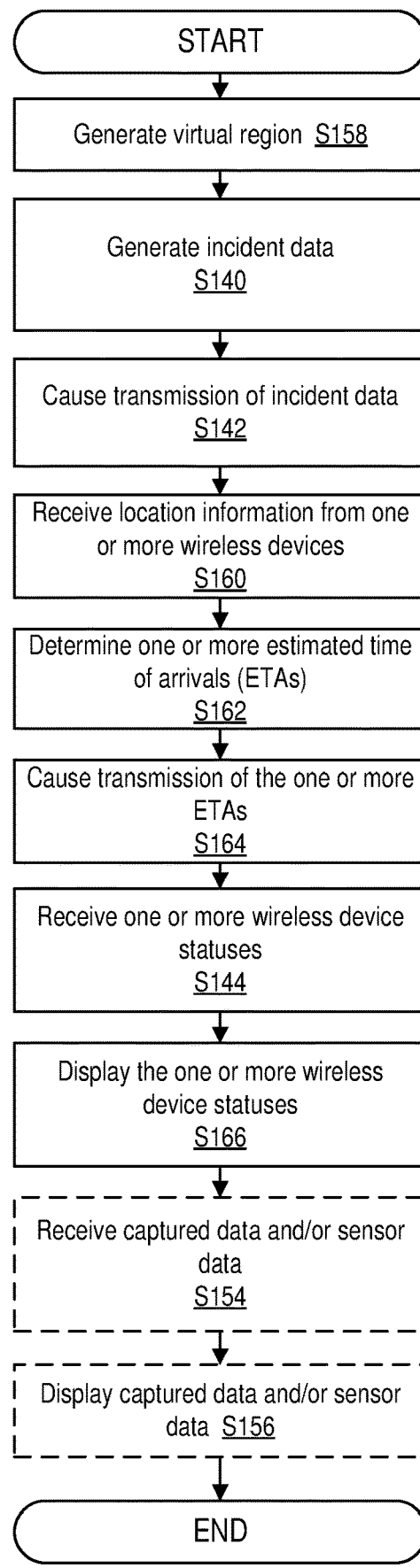
FIG. 7 is a flow diagram of an exemplary administration process in accordance with the principles of the invention.

FIG. 7 is a flow diagram of an exemplary administration process of administration code 21 in accordance with the principles of the invention. Processing circuitry 46 generates a virtual region (Block S158). In one or more embodiments, processing circuitry 46 generates the virtual region based on at least one of population proximate the incident, user inputs, reported severity of the incident, type of incident, and other factors. For example, a highly populated area may correspond to a larger/smaller size and/or different shape of the virtual region when compared to a predefined default size and/or shape. In another example, a user such as the incident command may input one or more characteristics of the virtual region such as size, shape, etc. Also, in another example, the size and/or shape of the virtual region is based on the severity of the incident such as a larger fire when compared to a default size fire may corresponds to a larger or small virtual region and/or specific shape. Further, in another example, the type of incident such as fire, criminal, etc. corresponds to a larger/smaller and/or different shape of the virtual region than a default virtual region shape. The default virtual region size/shape may be determined by a user of the incident commander and/or historical data of previously generated virtual regions.

Processing circuitry 46 generates incident data as discussed in FIG. 6 (Block S140). In one embodiment, incident data includes parameters of a virtual region that was precalculated by processing circuitry 46. Processing circuitry 46 causes transmission of incident data as discussed in FIG. 6 (Block S142). Processing circuitry 46 receives location information from one or more wireless devices 12 (Block S160). In one or more embodiments, processing circuitry 46 receives, via communication interface 44, location information such as GPS coordinates or other location data that is determinable by wireless device 12. Processing circuitry 46 determines one or more ETAs for each location information (Block S162). In one or more embodiments, the determination of one or more ETAs is based on GPS coordinates and/or traffic information, although other information could also be used by processing circuitry 46 to calculate the ETAs.

Processing circuitry 46 causes transmission of one or more ETAs (Block S164). For example, in one or more embodiments, processing circuitry 46 transmits each ETAs to a corresponding wireless device 12 associated with the ETAs. Processing circuitry 46 receives one or more wireless device statuses as discussed above with respect to FIG. 6 (Block S144). Processing circuitry 46 causes one or more wireless device 12 statuses to be displayed on display 40 (Block S166). Processing circuitry 46 receives captured data and/or sensor data as discussed above with respect to FIG. 6 (Block S154). Processing circuitry 46 displays captured data and/or sensor data as discussed above with respect to FIG. 6 (Block S156).

In one or more embodiments, processing circuitry 46 is configured to receive location information from at least one wireless device 12, determine whether the at least one wireless device 12 is within the virtual region based on the received location information, and cause transmission of a notification to at least on other wireless device 12 if the determination is made that the at least one wireless device 12 is within the virtual region. In one or more embodiments, the notification includes at least one of an indication that at least one wireless device 12 is within the virtual region, location data of the at least one wireless device 12 within the virtual region, among other data/information described herein.

Figure 8:
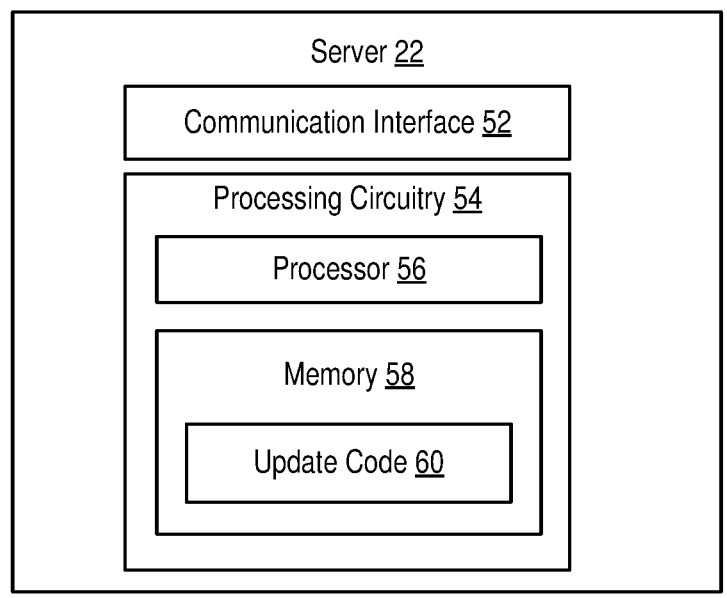
FIG. 8 is a block diagram of an exemplary server in accordance with the principles of the invention.

FIG. 8 is a block diagram of an exemplary server in accordance with the principle of the invention. Server 22 includes communication interface 52, processing circuitry 54, processor 56 and memory 58 that correspond to components as described with respect to wireless device 12, but with size and performance being based on design need. Communication interface 52 is configured to communicate with wireless device 12, management device 14 and other servers 22 via one or more communication protocols and one or communication networks, paths and/or links. Memory 58 is configured to store update code 60. For example, update code 60 includes instructions that, when executed by processor 56, causes processor 56 to perform the update process discussed in detail with respect to FIG. 8. Server 22 can be, for example, a server such as a single physical unit, a blade in a server rack, or a distributed processing system such as a virtual server.

Figure 9:
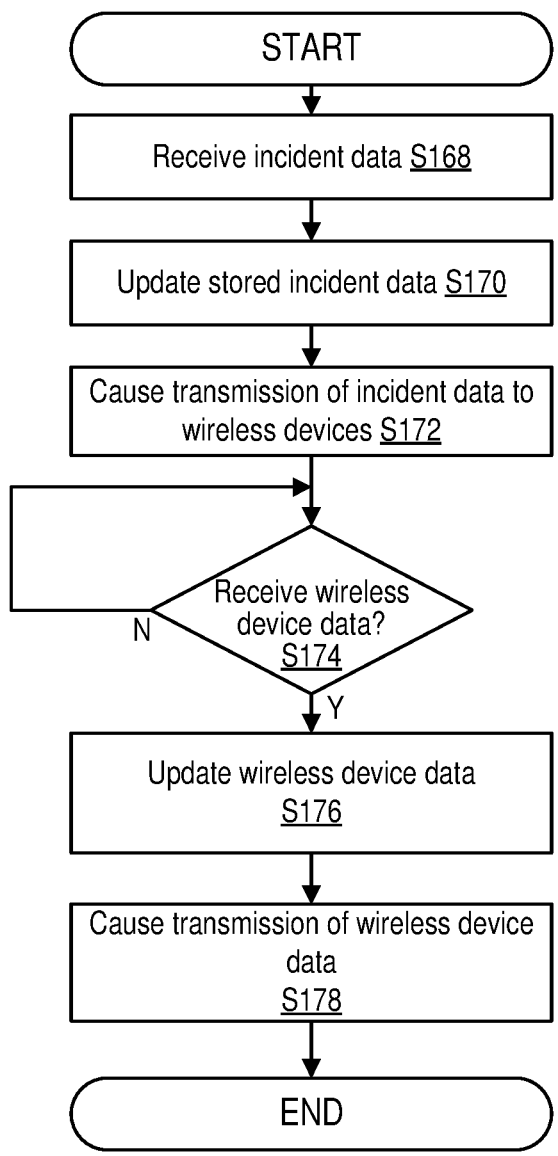
FIG. 9 is a flow diagram of an exemplary updating process in accordance with the principles of the invention.

FIG. 9 illustrates an exemplary updating process of updating code 60 in accordance with the principles of the invention. Processing circuitry 54 receives incident data (Block S168). For example, processing circuitry 54 receives incident data from management device 14. Processing circuitry 54 stores the received incident data (Block S170). Processing circuitry 54 causes transmission of incident data to one or more wireless devices 12 (Block S172). For example, processing circuitry 54 causes transmission to wireless devices 12 that include accountability code 18 such that these wireless devices 12 can perform certain functionality using the incident data as descried above. Processing circuitry 54 determines whether wireless device data has been received (Block S174). In one or more embodiments, wireless device data include user statuses such that server 22 and/or network cloud 16 track users' statuses of users associated with wireless device 12. The variety of user statuses are described above. Processing circuitry 54 updates wireless device data stored in server 22 and/or network cloud 16 (Block S176). Processing circuitry 54 causes transmission of at least a portion of the wireless device data (Block S178). For example, in one or more embodiments, at least a portion of the wireless device data is transmitted to management device 14.

Figure 10:
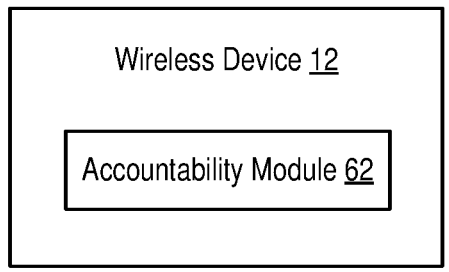
FIG. 10 is a block diagram of another embodiment of the wireless device in accordance with the principles of the invention.

FIG. 10 is another embodiment of exemplary wireless device 12 in accordance with the principles of the invention. Wireless device 12 includes accountability module 62 that is configured to perform the accountability process of FIGS. 4 and 5A-5B.

Figure 11:
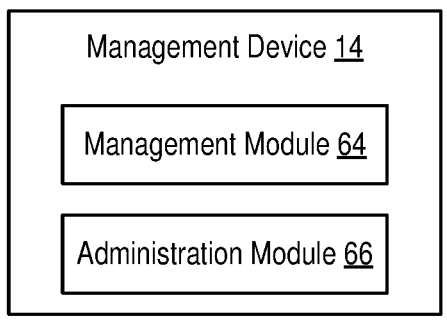
FIG. 11 is a block diagram of another embodiment of the management device in accordance with the principles of the invention.

FIG. 11 is another embodiment of exemplary management device 14 in accordance with the principles of the invention. Management device 14 includes management module 64 that is configured to perform the management process of FIG. 6. Management device 14 includes administration module 66 that is configured to perform the administration process of FIG. 7.

Figure 12:
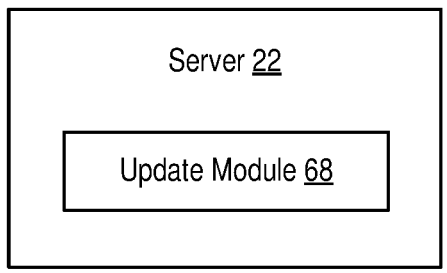
FIG. 12 is a block diagram of another embodiment of the server in accordance with the principles of the invention.

FIG. 12 is another embodiment of exemplary server 22 in accordance with the principles of the invention. Server 22 includes update module 68 that is configured to perform the management process of FIG. 9.

Some embodiments are described as follows. According to one embodiment of the invention, a wireless device 12 for facilitating personnel accountability is provided. The wireless device 12 includes processing circuitry 34. The processing circuitry 34 includes a processor 36 and a memory 38. The memory 38 contains instructions that, when executed by the processor 36, configure the processor 36 to receive incident data, the incident data including a location of an incident and determine whether confirmation has been received that a user of the wireless device 12 agrees to respond to the incident. The memory 38 contains further instructions that, when executed by the processor 36, configure the processor 36 to, in response to determining confirmation has been received: determine a location of the wireless device 12, determine a virtual region around the location of the incident, determine whether the wireless device 12 enters the virtual region, and cause transmission of a first update in response to determining the wireless device 12 enters the virtual region, the first update indicating the wireless device 12 is located within the virtual region.

According to one embodiment of this aspect, the incident data includes at least one parameter for determining the virtual region. The at least one parameter includes at least one of size and radius of the virtual region. According to another embodiment of this aspect, the incident data includes at least one of a severity of the incident and type of incident. According to another embodiment of this aspect, the memory 38 contains further instructions that, when executed by the processor 36, configure the processor 36 to: determine if the wireless device 12 exits the virtual region, and cause transmission of a second update if the wireless device 12 exits the virtual region, the second update indicating the wireless device 12 is outside of the virtual region.

According to another embodiment of this aspect, the wireless device 12 includes a display 24. The memory 38 contains further instructions that, when executed by the processor 36, configure the processor 36 to: receive personnel data, the personnel data indicating at least one other wireless device 12 that is within the virtual region, and cause the personnel data to be displayed by the display 24. According to another embodiment of this aspect, the memory 38 contains further instructions that, when executed by the processor, configure the processor 36 to: receive personnel data, the personnel data indicating confirmation that at least one other user of at least one other wireless device 12 agrees to respond to the incident, and cause the personnel data to be displayed by the display 24. According to another embodiment of this aspect, the wireless device 12 includes a display 24 for displaying information. The memory 38 contains further instructions that, when executed by the processor 36, configure the processor to calculate an estimated time of arrival to the location of the incident from the location of the wireless device 12 and cause transmission of the estimated time of arrival. According to another embodiment of this aspect, the wireless device 12 includes at least one capture element 28 configured to capture at least one of audio, video and at least one image. The memory 38 contains further instructions that, when executed by the processor 36, configure the processor to: receive a capture command, trigger the at least one capture element to capture at least one of audio, video and at least one image in response to the received capture command, and cause transmission of the captured at least one of audio, video and at least one image. According to another embodiment of this aspect, the wireless device 12 includes at least one sensor 30 configured to capture sensor data. The memory 38 contains further instructions that, when executed by the processor 36, configure the processor 36 to receive a sensor capture command, trigger capture of sensor data in response to the received sensor capture command and cause transmission of the sensor data.

According to another embodiment of the invention, a method for a wireless device 12 to facilitate personnel accountability is provided. Incident data is received (Block S100). The incident data includes a location of an incident. A determination is made whether confirmation has been received that a user of the wireless device 12 agrees to respond to the incident (Block S102). In response to determining confirmation has been received: a location of the wireless device 12 is determined (Block S104), determining a virtual region around the location of the incident is generated (Block S110), a determination is made whether the wireless device 12 enters the virtual region (Block S112), transmission of a first update is caused in response to determining the wireless device 12 enters the virtual region (Block S114), the first update indicating the wireless device 12 is located within the virtual region.

According to one embodiment of this aspect, the incident data includes at least one parameter for determining the virtual region. The at least one parameter includes at least one of size and radius of the virtual region. According to another embodiment of this aspect, the incident data includes at least one of a severity of the incident and type of incident. According to another embodiment of this aspect, a determination is made if the wireless device 12 exits the virtual region (Block S134). Transmission of a second update is caused if the wireless device 12 exits the virtual region, the second update indicating the wireless device 12 is outside of the virtual region (Block S138). According to another embodiment of this aspect, personnel data is received. The personnel data indicates at least one other wireless device 12 that is within the virtual region. The personnel data is caused to be displayed by the display 24.

According to another embodiment of this aspect, personnel data is received. The personnel data indicates confirmation that at least one other user of at least one other wireless device 12 agrees to respond to the incident. The personnel data is caused to be displayed by the display. According to another embodiment of this aspect, an estimated time of arrival to the location of the incident from the location of the wireless device 12 is determined and the estimated time of arrival is caused to be transmitted.

According to another embodiment of this aspect, a capture command is received. The at least one capture element 28 is triggered to capture at least one of audio, video and at least one image in response to the received capture command. Transmission of the captured at least one of audio, video and at least one image is caused. According to another embodiment of this aspect, a sensor capture command is received. Capture of sensor data is triggered in response to the received sensor capture command. Transmission of the sensor data is caused.

According to another embodiment of the invention, a wireless device 12 for facilitating personnel accountability is provided. The wireless device 12 includes an accountability module 62 configured to receive incident data, the incident data including a location of an incident and determine whether confirmation has been received that a user of the wireless device 12 agrees to respond to the incident. The accountability module 62 is further configured to, in response to determining confirmation has been received, determine a location of the wireless device 12, determine a first estimated time of arrival to the location of the incident from the location of the wireless device 12, cause transmission of the first estimated time of arrival, generate a virtual region around the location of the incident, determine if the wireless device 12 enters the virtual region, and cause transmission of a first update if the wireless device 12 enters the virtual region, the first update indicating the wireless device 12 is located within the virtual region.

According to another embodiment of this aspect, the accountability module 62 is further configured to determine if the wireless device 12 exits the virtual region, and cause transmission of a second update if the wireless device 12 exits the virtual region, the second update indicating the wireless device 12 is outside of the virtual region.

According to another embodiment of the invention, a management device 14 for facilitating personnel accountability is provided. The management device 14 includes processing circuitry 46 that includes a processor 48 and a memory 50. The memory 50 contains instructions that, when executed by the processor 48, configure the processor 48 to: generate a virtual region, generate incident data, the incident data include at least one parameter of the virtual region, cause transmission of the incident data to a plurality of wireless device 12, receive location information from at least one of the plurality of wireless devices 12, determine at least one estimated time of arrival (ETA) for the at least one of the plurality of wireless devices 12, and cause transmission of the at least one ETA.

According to one embodiment of this aspect, the virtual region is generated based at least in part on a severity of the incident, population of an area proximate an incident area and type of incident. According to another embodiment of this aspect, the memory 50 contains further instructions that, when executed by the processor 48, configure the processor 48 to: receive location information from at least one wireless device 12, determine whether the at least one wireless device 12 is within the virtual region based on the received location information, and cause transmission of a notification to at least one other wireless device 12 if the determination is made that the at least one wireless device 12 is within the virtual region.

According to another embodiment of the invention, a method for facilitating personnel accountability is provided. A virtual region is generated (Block S158). Incident data is generated. The incident data include at least one parameter of the virtual region. Transmission of the incident data to a plurality of wireless device 12 is caused (Block S140). Location information from at least one of the plurality of wireless devices 12 is received (Block S160). At least one estimated time of arrival (ETA) for the at least one of the plurality of wireless devices 12 is determined (Block S162). Transmission of the at least one ETA is caused (Block S164).

According to another embodiment of this aspect, the virtual region is generated based at least in part on a severity of the incident, population of an area proximate an incident area and type of incident.

According to another embodiment of this aspect, location information is received from at least one wireless device 12. A determination is made whether the at least one wireless device 12 is within the virtual region based on the received location information. Transmission of a notification to at least one other wireless device 12 is caused if the determination is made that the at least one wireless device 12 is within the virtual region.

According to another embodiment of the invention, a management device 14 for facilitating personnel accountability is provided. The management device 14 includes an administration module 66 configured to: generate a virtual region, generate incident data where the incident data include at least one parameter of the virtual region, cause transmission of the incident data to a plurality of wireless device 12, receive location information from at least one of the plurality of wireless devices 12, determine at least one estimated time of arrival (ETA) for the at least one of the plurality of wireless devices 12, and cause transmission of the at least one ETA.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows. Computer program code for carrying out operations of the concepts described herein may be written in an object-oriented programming language such as Java® or C++. However, the computer program code for carrying out operations of the disclosure may also be written in conventional procedural programming languages, such as the "C", "C #", Objective C or Swift programming languages. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support embodiments directed to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A wireless device for facilitating personnel accountability, the wireless device comprising:
    processing circuitry, the processing circuitry including a processor and a memory, the memory containing instructions that, when executed by the processor, configure the processor to:
        receive incident data, the incident data including a location of an incident;
        determine whether confirmation has been received that a user of the wireless device agrees to respond to the incident;
        in response to determining confirmation has been received:
            determine a location of the wireless device;
            determine a virtual region around the location of the incident;
            determine whether the wireless device enters the virtual region; and
            cause transmission of a first update in response to determining the wireless device enters the virtual region, the first update indicating the wireless device is located within the virtual region;
        receive a sensor capture command from a remote wireless device;
        trigger capture of sensor data in response to the received sensor capture command; and
        cause transmission to the remote wireless device of the sensor data captured in response to the received capture command.

2. The wireless device of claim 1, wherein the incident data includes at least one parameter for determining the virtual region, the at least one parameter includes at least one of size and radius of the virtual region.

3. The wireless device of claim 2, wherein the incident data includes at least one of a severity of the incident and type of incident.

4. The wireless device of claim 1, wherein the memory contains further instructions that, when executed by the processor, configure the processor to:
    determine if the wireless device exits the virtual region; and
    cause transmission of a second update if the wireless device exits the virtual region, the second update indicating the wireless device is outside of the virtual region.

5. The wireless device of claim 1, further comprising a display; and
    the memory contains further instructions that, when executed by the processor, configure the processor to:
        receive personnel data, the personnel data indicating at least one other wireless device that is within the virtual region; and
        cause the personnel data to be displayed by the display.

6. The wireless device of claim 1, further comprising a display, and
    the memory contains further instructions that, when executed by the processor, configure the processor to:
        receive personnel data, the personnel data indicating confirmation that at least one other user of at least one other wireless device agrees to respond to the incident; and
        cause the personnel data to be displayed by the display.

7. The wireless device of claim 1, wherein the memory contains further instructions that, when executed by the processor, configure the processor to:
    determine an estimated time of arrival to the location of the incident from the location of the wireless device; and
    cause transmission of the first estimated time of arrival.

8. The wireless device of claim 1, further comprising at least one capture element configured to capture at least one of audio, video and at least one image; and
    the memory contains further instructions that, when executed by the processor, configure the processor to:
        receive a capture command;
        trigger the at least one capture element to capture at least one of audio, video and at least one image in response to the received capture command; and
        cause transmission of the captured at least one of audio, video and at least one image.

9. A method for facilitating personnel accountability using a wireless device, the method comprising:
    receiving incident data, the incident data including a location of an incident;
    determining whether confirmation has been received that a user of the wireless device agrees to respond to the incident;
    in response to determining confirmation has been received:
        determining a location of the wireless device;
        determining a virtual region around the location of the incident;
        determining whether the wireless device enters the virtual region; and
        causing transmission of a first update from the wireless device in response to determining the wireless device enters the virtual region, the first update indicating the wireless device is located within the virtual region;
    receiving a sensor capture command from a remote wireless device;
    triggering capture of sensor data in response to the received sensor capture command; and
    causing transmission to the remote wireless device of the sensor data captured in response to the received capture command.

10. The method of claim 9, wherein the incident data includes at least one parameter for determining the virtual region, the at least one parameter includes at least one of size and radius of the virtual region.

11. The method of claim 10, wherein the incident data includes at least one of a severity of the incident and type of incident.

12. The method of claim 9, further comprising:
    determining if the wireless device exits the virtual region; and causing transmission of a second update if the wireless device exits the virtual region, the second update indicating the wireless device is outside of the virtual region.

13. A method for facilitating personnel accountability, the method comprising:
   generating a virtual region;
   generating incident data, the incident data include at least one parameter of the virtual region;
   causing transmission of the incident data to a plurality of wireless devices;
   receiving location information from at least one of the plurality of wireless devices;
   determining at least one estimated time of arrival (ETA) at the virtual region for the at least one of the plurality of wireless devices;
   causing transmission of the at least one ETA to the at least one of the plurality of wireless devices;
   receiving a sensor capture command from a first remote wireless device;
   triggering capture of sensor data by a second wireless device in response to the received sensor capture command; and
   causing transmission to the first remote wireless device of the sensor data captured by the second wireless device in response to the received capture command.

14. The method of claim 13, wherein the virtual region is generated based at least in part on a severity of the incident, population of an area proximate an incident area and type of incident.

15. The method of claim 13, further comprising:
   receiving location information from at least one wireless device;
   determining whether the at least one wireless device is within the virtual region based on the received location information; and
   causing transmission of a notification to at least one other wireless device if the determination is made that the at least one wireless device is within the virtual region.

* * * * *